US008094682B2

(12) United States Patent
Pani et al.

(10) Patent No.: US 8,094,682 B2
(45) Date of Patent: Jan. 10, 2012

(54) METHOD AND APPARATUS FOR GENERATING RADIO LINK CONTROL PROTOCOL DATA UNITS

(75) Inventors: Diana Pani, Montreal (CA); Paul Marinier, Brossard (CA); Christopher Cave, Verdun (CA); Stephen E. Terry, Northport, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 641 days.

(21) Appl. No.: 12/238,638

(22) Filed: Sep. 26, 2008

(65) Prior Publication Data

US 2009/0190526 A1 Jul. 30, 2009

Related U.S. Application Data

(60) Provisional application No. 61/044,765, filed on Apr. 14, 2008, provisional application No. 61/038,682, filed on Mar. 21, 2008, provisional application No. 61/038,515, filed on Mar. 21, 2008, provisional application No. 61/026,912, filed on Feb. 7, 2008, provisional application No. 61/013,173, filed on Dec. 12, 2007, provisional application No. 60/982,596, filed on Oct. 25, 2007, provisional application No. 60/975,955, filed on Sep. 28, 2007, provisional application No. 60/976,319, filed on Sep. 28, 2007.

(51) Int. Cl.
    *H04J 3/24* (2006.01)
(52) U.S. Cl. .................................... 370/474; 370/328
(58) Field of Classification Search .................. 370/328, 370/336–338, 342, 345, 474; 455/67.11, 455/68

See application file for complete search history.

(56) References Cited

U.S. PATENT DOCUMENTS

| 6,904,016 | B2 * | 6/2005 | Kuo et al. ..................... 370/235 |
| 7,206,295 | B2 | 4/2007 | Seguin |
| 7,593,694 | B2 | 9/2009 | Michel et al. |
| 7,729,719 | B2 | 6/2010 | Bergstrom et al. |
| 2002/0021714 | A1 | 2/2002 | Seguin |
| 2006/0176806 | A1 | 8/2006 | Yoshihara et al. |

(Continued)

FOREIGN PATENT DOCUMENTS

EP  0 991 208  5/2000

(Continued)

OTHER PUBLICATIONS

Ericsson et al., "New Work Item Proposal: Improved L2 for Uplink", 3GPP TSG-RAN Meeting#37, RP-070717, (Riga, Latvia Sep. 11-14, 2007).

(Continued)

*Primary Examiner* — Ricky Ngo
*Assistant Examiner* — Kan Yuen
(74) *Attorney, Agent, or Firm* — Condo Roccia LLP

(57) ABSTRACT

A method and apparatus are used to generate radio link control (RLC) protocol data units (PDUs). A data request for a logical channel is received as part of an enhanced dedicated channel (E-DCH) transport format combination (E-TFC) selection procedure in a medium access control (MAC). Upon determining the data field size, an RLC PDU is generated such that it matches the requested data from the E-TFC selection. The size of the RLC PDU generated can be greater than or equal to the minimum configured RLC PDU size (if data is available) and less than or equal to the maximum RLC PDU size. The data is then transmitted in the RLC PDU in a current transmission time interval (TTI).

22 Claims, 6 Drawing Sheets

U.S. PATENT DOCUMENTS

| | | | |
|---|---|---|---|
| 2006/0268938 | A1 | 11/2006 | Terry |
| 2007/0060139 | A1 | 3/2007 | Kim et al. |
| 2007/0073895 | A1 | 3/2007 | Sebire et al. |
| 2007/0230384 | A1 | 10/2007 | Yi et al. |
| 2007/0263568 | A1 | 11/2007 | Kim et al. |
| 2008/0080381 | A1 | 4/2008 | Maheshwari et al. |
| 2008/0298322 | A1* | 12/2008 | Chun et al. .................. 370/335 |
| 2008/0298332 | A1 | 12/2008 | Erami |
| 2009/0036061 | A1* | 2/2009 | Chun et al. ..................... 455/68 |
| 2009/0097444 | A1 | 4/2009 | Lohr et al. |

FOREIGN PATENT DOCUMENTS

| | | |
|---|---|---|
| EP | 1158715 A1 | 11/2001 |
| EP | 1 487 161 | 12/2004 |
| EP | 1 720 322 | 11/2006 |
| EP | 1 764 980 | 3/2007 |
| WO | 00/21253 | 4/2000 |
| WO | 2007/091965 | 8/2007 |
| WO | WO 2009/045882 A2 | 4/2009 |
| WO | WO 2009/045892 A2 | 4/2009 |

OTHER PUBLICATIONS

Ericsson, "RLC PDU Size Adaption", 3GPP TSG-RAN2 Meeting #62, R2-082815, (Kansas City, USA, May 5-9, 2008).

Ericsson, "Support for Flexible RLC PDU Sizes in UL", 3GPP TSG-RAN WG #59-bis, R2-074033, (Shanghai, China, Oct. 8-12, 2007).

Third Generation Partnership Project, "Technical Specification Group Radio Access Network; Radio Link Control (RLC) Protocol Specification (Release 7)", 3GPP TS 25.322 V7.4.0, (May 2008).

Third Generation Partnership Project, "Technical Specification Group Radio Access Network; Radio Link Control (RLC) Protocol Specification (Release 7)", 3GPP TS 25.322 V7.8.0, (Sep. 2008).

Third Generation Partnership Project, "Technical Specification Group Radio Access Network; Radio Link Control (RLC) Protocol Specification (Release 8)", 3GPP TS 25.322 V8.3.0, (Sep. 2008).

Third Generation Partnership Project, "Technical Specification Group Radio Access Network; Medium Access Control (MAC) Protocol Specification (Release 7)", 3GPP TS 25.321 V7.5.0, (Jun. 2007).

Third Generation Partnership Project, "Technical Specification Group Radio Access Network; Medium Access Control (MAC) Protocol Specification (Release 7)", 3GPP TS 25.321 V7.10.0, (Sep. 2008).

Third Generation Partnership Project, "Technical Specification Group Radio Access Network; Medium Access Control (MAC) Protocol Specification (Release 8)", 3GPP TS 25.321 V8.3.0, (Sep. 2008).

Third Generation Partnership Project, "Technical Specification Group Radio Access Network; HSPA Evolution (FDD); (Release 7)", 3GPP TR 25.999 V2.1.0, (May 2007).

Third Generation Partnership Project, "Technical Specification Group Radio Access Network; HSPA Evolution (FDD); (Release 7)", 3GPP TR 25.999 V2.2.0, (Sep. 2007).

Third Generation Partnership Project, "Technical Specification Group Radio Access Network; HSPA Evolution (FDD); Release 7)", 3GPP TR 25.999 V2.3.0, (Sep. 2007).

Third Generation Partnership Project, "Technical Specification Group Radio Access Network; HSPA Evolution (FDD); (Release 7)", 3GPP TR 25.999 V2.4.0, (Sep. 2007).

Third Generation Partnership Project, "Technical Specification Group Radio Access Network; High Speed Packet Access (HSPA) Evolution; Frequency Division Duplex (FDD) (Release 7)", 3GPP TR 25.999 V7.1.0, (Mar. 2008).

Third Generation Partnership Project, "Technical Specification Group Radio Access Network; Radio Resource Control (RRC); Protocol Specification (Release 7)", 3GPP TS 25.331 V7.5.0, (Jun. 2007).

Third Generation Partnership Project, "Technical Specification Group Radio Access Network; Radio Resource Control (RRC); Protocol Specification (Release 7)", 3GPP TS 25.331 V8.4.0, (Sep. 2008).

Third Generation Partnership Project, "Technical Specification Group Radio Access Network; RLC protocol specification (Release 6)," 3GPP TS 25.322 V6.10.0 (Jun. 2007).

Third Generation Partnership Project, "Technical Specification Group Radio Access Network; RLC protocol specification (Release 6)," 3GPP TS 25.322 V6.12.0 (Jun. 2008).

Third Generation Partnership Project, "Technical Specification Group Radio Access Network; RLC protocol specification (Release 7)," 3GPP TS 25.322 V7.3.0 (Jun. 2007).

Third Generation Partnership Project, "Technical Specification Group Radio Access Network; Radio Resource Control (RRC); Protocol Specification (Release 5)," 3GPP TS 25.331 V5.22.1 (Aug. 2008).

Third Generation Partnership Project, "Technical Specification Group Radio Access Network; Radio Resource Control (RRC); Protocol Specification (Release 5)," 3GPP TS 25.331 V5.19.0 (Dec. 2006).

Third Generation Partnership Project, "Technical Specification Group Radio Access Network; Radio Resource Control (RRC); Protocol Specification (Release 4)," 3GPP TS 25.331 V4.19.0 (Jun. 2008).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, "Technical Specification Group Radio Access Network; Radio Resource Control (RRC); Protocol Specification (Release 6)," 3GPP TS 25.331 V6.14.0 (Jun. 2007).

Third Generation Partnership Project, "Technical Specification Group Radio Access Network; Radio Resource Control (RRC); Protocol Specification (Release 6)," 3GPP TS 25.331 V6.19.0 (Sep. 2008).

Third Generation Partnership Project, "Technical Specification Group Radio Access Network; Radio Resource Control (RRC); Protocol Specification (Release 7)," 3GPP TS 25.331 V7.10.0 (Jun. 2007).

Third Generation Partnership Project, "Technical Specification Group Radio Access Network; MAC Protocol Specification (Release 5)," 3GPP TS 25.321 v5.13.0 (Mar. 2007).

Third Generation Partnership Project, "Technical Specification Group Radio Access Network; MAC Protocol Specification (Release 5)," 3GPP TS 25.321 v5.14.0 (Sep. 2008).

Third Generation Partnership Project, "Technical Specification Group Radio Access Network; MAC Protocol Specification (Release 6)," 3GPP TS 25.321 v6.13.0 (Jun. 2007).

Third Generation Partnership Project, "Technical Specification Group Radio Access Network; MAC Protocol Specification (Release 6)," 3GPP TS 25.321 v6.16.0 (Sep. 2008).

International Patent Application No. PCT/US2008/077918: International Search Report dated Apr. 17, 2009, 3 pages.

International Patent Application No. PCT/US2008/077918: Notification of Transmittal of International Preliminary Report on Patentability dated Dec. 22, 2009, 7 pages.

International Patent Application No. PCT/US2008/077918: Written Opinion dated Apr. 17, 2009, 7 pages.

Vacirca et al., "On the Effects of ARQ Mechanisms on TCP Performance in Wireless Environments", GLOBECOM 2003, IEEE, Dec. 1-5, 2003, 1-5.

Kaist, "EE520 Telecommunication Network", Communication Networks Research Lab., 2000, 1-107.

International Patent Application No. PCT/US2008/077844: International Search Report dated Jun. 17, 2009, 7 pages.

International Patent Application No. PCT/US2008/077844: Notification of Transmittal of International Preliminary Report on Patentability dated Dec. 22, 2009, 7 pages.

International Patent Application No. PCT/US2008/077844: Written Opinion dated Jun. 17, 2009, 6 pages.

3rd Generation Partnership Project (3GPP), TS 25.322 V8.2.0, "3rd Generation Partnership Project; Technical Specification Group Radio Access Network; Radio Link Control (RLC) Protocol Specification (Release 8)", May 2008, 89 pages.

International Patent Application No. PCT/US2008/077812: International Search Report dated Apr. 17, 2009, 3 pages.
International Patent Application No. PCT/US2008/077812: Notification of Transmittal of International Preliminary Report on Patentability dated Dec. 22, 2009, 5 pages.

International Patent Application No. PCT/US2008/077812: Written Opinion dated Apr. 17, 2009, 7 pages.

* cited by examiner

METHOD AND APPARATUS FOR GENERATING RADIO LINK CONTROL PROTOCOL DATA UNITS

CROSS REFERENCE TO RELATED APPLICATIONS

This application claims the benefit of U.S. Provisional Application Nos. 60/982,596 filed on Oct. 25, 2007, 61/038,515 filed on Mar. 21, 2008, 61/013,173 filed on Dec. 12, 2007, 61/026,912 filed on Feb. 7, 2008, 61/038,682 filed on Mar. 21, 2008, 61/044,765 filed on Apr. 14, 2008, 60/975,955 filed on Sep. 28, 2007, and 60/976,319 filed on Sep. 28, 2007, which are incorporated by reference as if fully set forth.

TECHNOLOGY FIELD

This application is related to wireless communications.

BACKGROUND

The Third Generation Partnership Project (3GPP) is a collaboration between groups of telecommunications associations to make a globally applicable third generation (3G) wireless communications system. FIG. 1 is an overview of the system architecture for a conventional Universal Mobile Telecommunications System (UMTS) network.

The UMTS network architecture includes a Core Network (CN), a UMTS Terrestrial Radio Access Network (UTRAN), and at least one user equipment (UE). The CN is interconnected with the UTRAN via an Iu interface.

The UTRAN is configured to provide wireless telecommunication services to UEs, referred to as wireless transmit/receive units (WTRUs) in this application, via a Uu radio interface. A commonly employed air interface defined in the UMTS standard is wideband code division multiple access (W-CDMA). The UTRAN comprises one or more radio network controllers (RNCs) and base stations, referred to as Node Bs by 3GPP, which collectively provide for the geographic coverage for wireless communications with the at least one UE. One or more Node Bs are connected to each RNC via an Iub interface. The RNCs within the UTRAN communicate via an Iur interface.

FIG. 2 is a block diagram of an example UE 200. The UE 200 may include an RRC entity 205, an RLC entity 210, a MAC entity 215 and a physical (PHY) layer 1 (L1) entity 220. The RLC entity 210 includes a transmitting side subassembly 225 and a receiving side subassembly 230. The transmitting side subassembly 225 includes a transmission buffer 235.

FIG. 3 is a block diagram of an example UTRAN 300. The UTRAN 300 may include an RRC entity 305, an RLC entity 310, a MAC entity 315 and PHY L1 entity 320. The RLC entity 310 includes a transmitting side subassembly 325 and a receiving side subassembly 330. The transmitting side subassembly 325 includes a transmission buffer 335.

3GPP Release 6 introduced high-speed uplink packet access (HSUPA) to provide higher data rates for uplink transmissions. As part of HSUPA, a new transport channel, the enhanced dedicated channel (E-DCH), was introduced to carry uplink (UL) data at higher rates.

FIG. 4 shows an overview of the RLC sub-layers. The RLC sub-layer consists of RLC entities, of which there are three types: Transparent Mode (TM), Unacknowledged Mode (UM), and Acknowledged Mode (AM) RLC entities. A UM and a TM RLC entity may be configured to be a transmitting RLC entity or a receiving RLC entity. The transmitting RLC entity transmits RLC PDUs and the receiving RLC entity receives RLC PDUs. An AM RLC entity consists of a transmitting side for transmitting RLC PDUs and a receiving side for receiving RLC PDUs.

Each RLC entity is defined as a sender or as a receiver depending on elementary procedures. In UM and TM, the transmitting RLC entity is a sender and a peer RLC entity is a receiver. An AM RLC entity may be either a sender or a receiver depending on the elementary procedure. The sender is the transmitter of acknowledged mode data (AMD) PDUs and the receiver is the receiver of AMD PDUs. A sender or receiver may be at either the UE or the UTRAN.

There is one transmitting RLC entity and one receiving RLC entity for each TM and UM service. However, there is one combined transmitting and receiving RLC entity for the AM service.

Both a UM RLC entity and a TM RLC entity use one logical channel to send data PDUs and one logical channel to receive data PDUs. An AM RLC entity may be configured to use one or two logical channels to send or receive both data PDUs and control PDUs. If only one logical channel is configured, then the transmitting AM RLC entity transmits both data PDUs and control PDUs on the same logical channel.

The AM or UM RLC entity may be configured to generate either fixed size PDUs or flexible size PDUs. If a fixed RLC PDU size is configured, the RLC PDU size is the same for both data PDUs and control PDUs. If a flexible RLC PDU size is configured, the data PDU size is variable. Unfortunately, the determination of a proper flexible RLC PDU size is not defined.

Currently, an RLC entity is radio unaware, (i.e. not aware of current radio conditions). When the RLC entity is designed to be radio unaware, the RLC entity generates RLC PDUs of a maximum size. Depending on current radio conditions and a given grant, this may result in the generation of more than one PDU per TTI. Unfortunately, if the generated RLC PDU is larger than a selected E-DCH transport format combination (E-TFC) size, then the generated RLC PDU may be segmented.

One disadvantage of the radio unaware RLC is that a large L2 overhead is results when a small fixed RLC PDU size is used. Another disadvantage is that large error rates result from residual HARQ errors where MAC segmentation is used with a large fixed RLC PDU size. (Note: residual HARQ error=the transmission of the improved MAC (MAC-i/is) PDU has failed. If there is a large number of segments, the chance that any of the MAC-i/is PDU carrying a segment fails is larger, thus the RLC PDU error rate increases.)

However, in the UL direction, an RLC entity may be radio aware, (i.e. aware of current radio conditions), because both RLC and MAC protocols are located in the same node. As a result, an RLC PDU size may be determined based on an instantaneous available data rate.

A radio aware RLC entity may generate RLC PDUs according to the available bit rate. There is minimal overhead and low error rates due to residual hybrid automatic repeat request (HARQ) error rates. However, a radio aware RLC entity may not be able to generate an RLC PDU at a given TTI because the generation of the RLC PDU within a short amount of time may require too much processing power. For example, a radio aware RLC entity requires that a ciphering function be performed on the generated RLC PDUs. Additionally, a radio aware RLC entity has a higher overhead for small E-TFC sizes and a lower overhead for large transport block sizes.

A radio aware RLC entity generates RLC PDUs that match a transport block size configured for low HARQ residual error rates. Because a radio aware RLC generates a large RLC PDU when there is a large E-TFC selection, there are problems when the large RLC PDU needs to be retransmitted and the E-TFC selection decreases in size. Further, the retransmission of the large RLC PDU requires the generation of a large number of MAC segments. As a result, there may be an increase of RLC PDU error rates due to residual HARQ residual errors.

Accordingly, there exists a need for a method for use in an RLC entity that generates RLC PDUs such that RLC overhead and HARQ residual error rates are reduced.

SUMMARY

A method and apparatus are used to generate radio link control (RLC) protocol data units (PDUs). A data request for a logical channel is received as part of an enhanced dedicated channel (E-DCH) transport format combination (E-TFC) selection procedure in a medium access control (MAC). Upon determining the data field size, an RLC PDU is generated such that it matches the requested data from the E-TFC selection. The size of the RLC PDU generated can be greater than or equal to the minimum configured RLC PDU size (if data is available) and less than or equal to the maximum RLC PDU size. The data is then transmitted in the RLC PDU in a current transmission time interval (TTI).

BRIEF DESCRIPTION OF THE DRAWINGS

A more detailed understanding may be had from the following description, given by way of example in conjunction with the accompanying drawing wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a base station, a site controller, an access point (AP), or any other type of interfacing device capable of operating in a wireless environment. When referred to hereafter, UTRAN includes but is not limited to a cell, a base station, an RNC, or a network node.

Various methods are disclosed herein for generating RLC PDUs such that RLC overhead and RLC PDU error rates due to HARQ residual errors are reduced. Although the methods are described for a WTRU, they are equally applicable to a collapsed architecture Node B+, where a radio network controller (RNC) and a Node-B are located in one node. When applying the concept to the Node B+, the terminology WTRU may be interchanged with the terminology Node B+.

Hereinafter, the terminology "transport block" may refer to any of the following: a MAC-e PDU, MAC-i PDU, MAC-es PDU, a MAC-is PDU, or a MAC PDU. The terminology "number of bits in a transport block" or "selected transport block (TB)" is used to refer to any of the following quantities: the total size of the transport block (or "transport block size"); the total size of the transport block minus the number of bits required for MAC header; the number of bits available to the MAC-d flow or logical channel to which the RLC PDU belongs according to the E-DCH transport format combination (E-TFC) selection procedure; the number of bits available to a combination of MAC-d flows or logical channels according to the E-TFC selection procedure; and the number of bits requested from the given logical channel as part of the E-TFC selection procedure.

Figure 1:
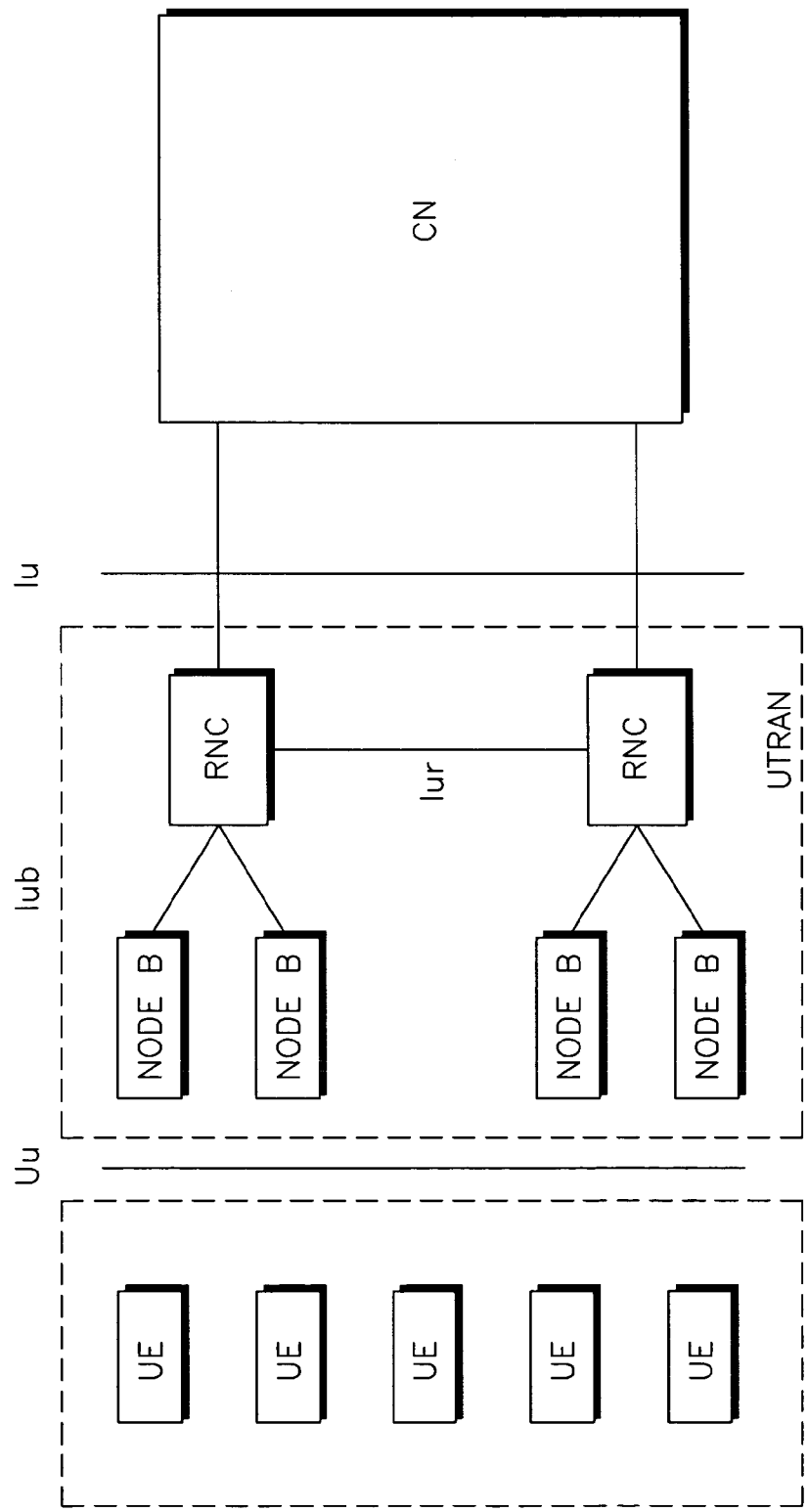
FIG. 1 shows an overview of the system architecture for a conventional Universal Mobile Telecommunications System (UMTS) network.

Referring to FIG. 1, the UTRAN may be modified to also include a target Node-B, a source Node-B, a controlling RNC (CRNC) and a serving RNC (SRNC). The RNC may include an RLC unit and an RRC unit (not shown). Alternatively, the RNC functionalities are included in the Node-B and thus no controlling RNC or serving RNC is present.

The UTRAN may be modified to receive at least one RLC service data unit (SDU). The UTRAN may also be configured to reduce RLC overhead and residual HARQ error rates using at least one technique described below. The UTRAN may further be configured to generate an RLC PDU between a minimum and a maximum RLC PDU size when RLC data is available.

Figure 2:
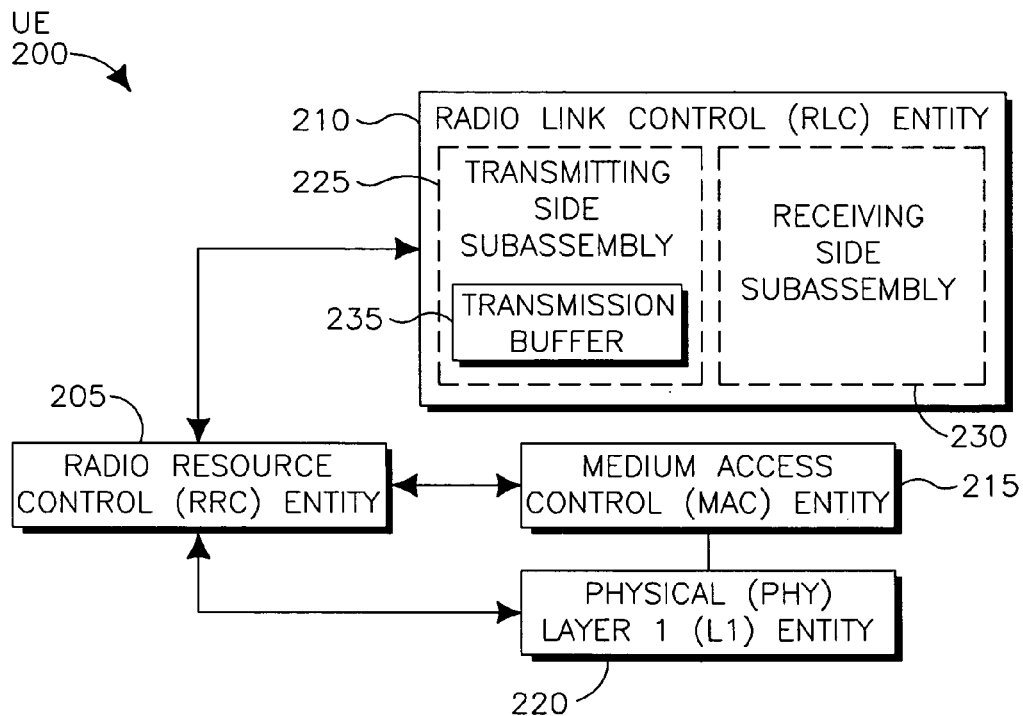
FIG. 2 is a block diagram of an example UE.
Figure 3:
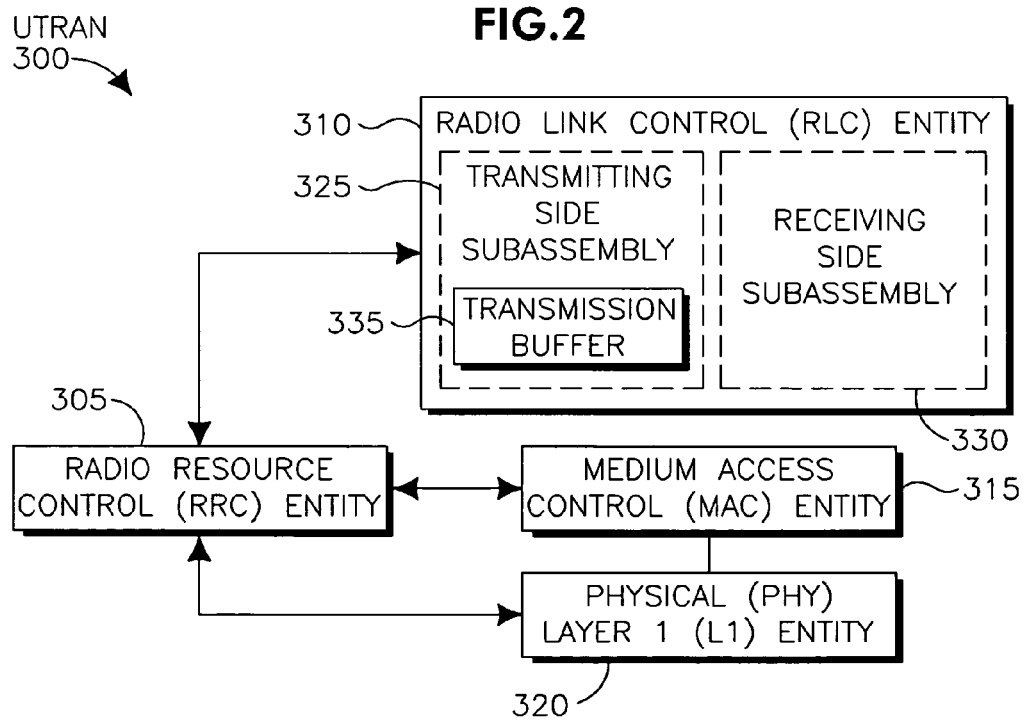
FIG. 3 is a block diagram of an example UTRAN.
Figure 4:
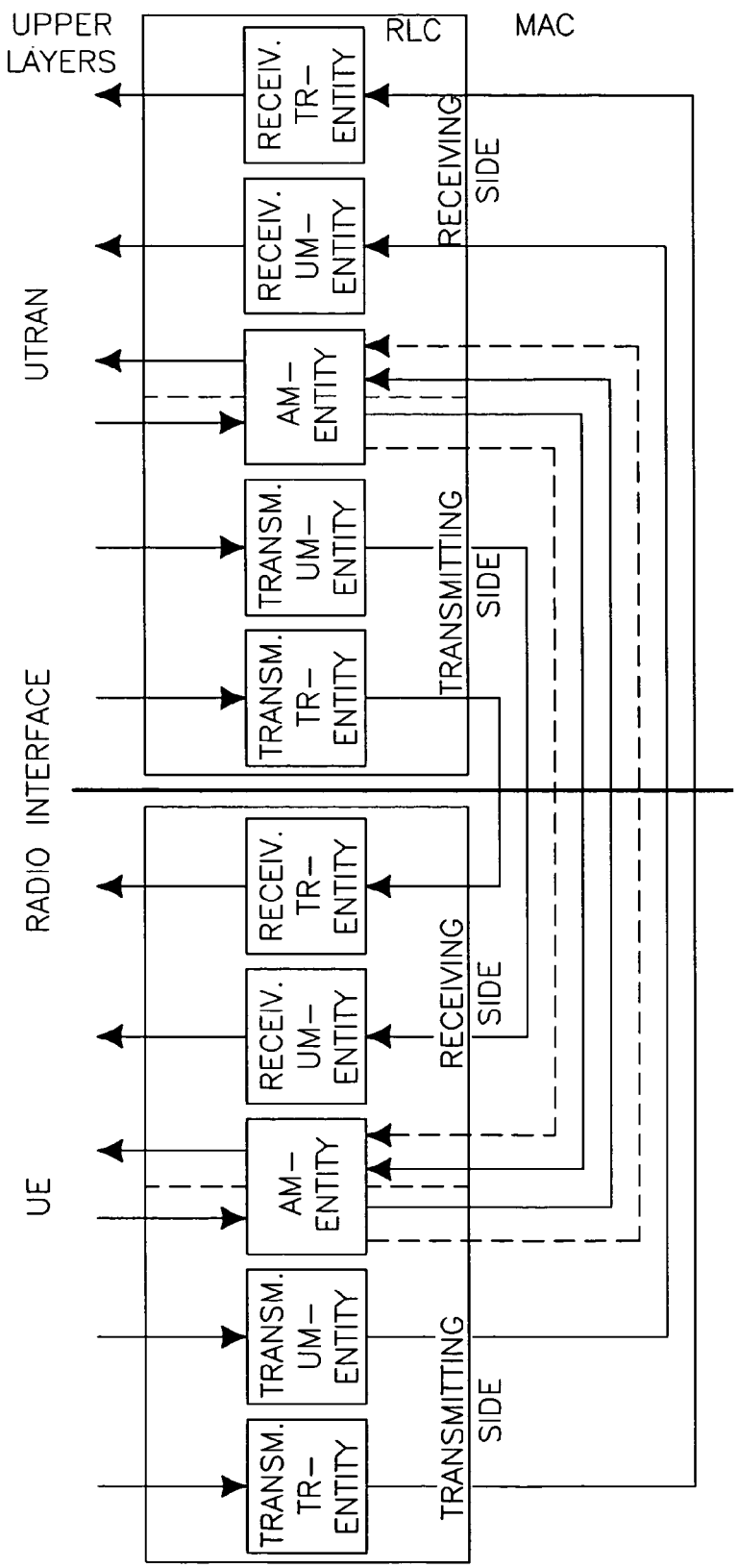
FIG. 4 shows an overview of the RLC sub-layers.

Referring to FIG. 2, the UE 200 may be modified to transmit data in at least one RLC PDU in a current TTI. The RLC entity 225 of the UE 200 may be configured to receive a data request for a logical channel from the MAC entity 215 as part of an E-TFC selection procedure. The UE 200 may also be configured to determine a data field size and generate at least one RLC PDU based on the determined data field size corresponding to the data request. The UE 200 may also be configured to generate an RLC PDU between a maximum RLC PDU size and a minimum RLC PDU size when RLC data is available.

Referring again to FIG. 2, the RLC entity 210 in the UE 200 may be modified to generate RLC PDUs on a TTI basis. In order to do so, the RLC entity 210 relies on a data request provided by the MAC entity 215 as part of the E-TFC selection procedure. The data request provided by the MAC entity 215 allows the RLC entity 210 to become aware of a channel condition, a grant, and a supported E-TFC size for a given TTI. The E-TFC selection function in the MAC entity 215 transmits a data request to the RLC entity 210 for a logical channel. This data request corresponds to the available space for this logical channel in the transport block, taking into account the applicable MAC-is header and the data in the corresponding MAC segmentation entity. The RLC entity 210 may generate one or more RLC PDUs of a predetermined size based on the data request from the E-TFC selection. To avoid the generation of both small RLC PDUs or large RLC PDUs, the RLC entity 210 may have radio aware capabilities with a number of restrictions. The RLC PDU size may not be greater than maximum RLC PDU size and may not be smaller than minimum RLC PDU size if data is available.

Figure 5:
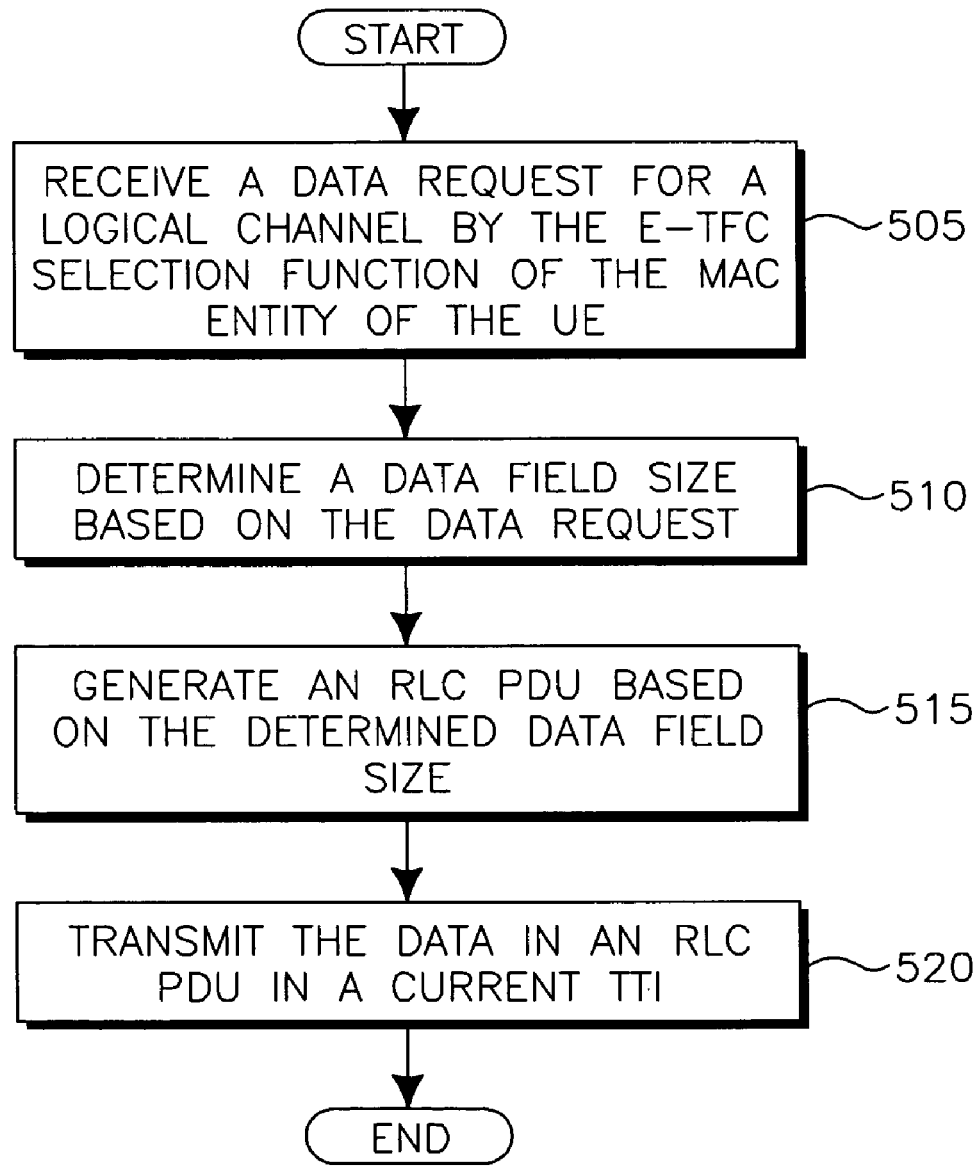
FIG. 5 is a flow diagram of an RLC PDU generation procedure.

FIG. 5 is a flow diagram of an RLC PDU generation procedure 500. Referring to FIG. 5, upon receiving a data request for a logical channel by the E-TFC selection function of the MAC (step 505), a data field size is determined based on the data request (step 510). The data field size is determined such that the RLC PDU (i.e., the data field size plus the RLC header) is equal to the data request. An RLC PDU is then generated based on the determined data field size (step 515).

The data is transmitted in an RLC PDU in a current TTI (step 520). Optionally, the MAC-i PDU header can also be taken into account when determining the data field size.

Figure 6:
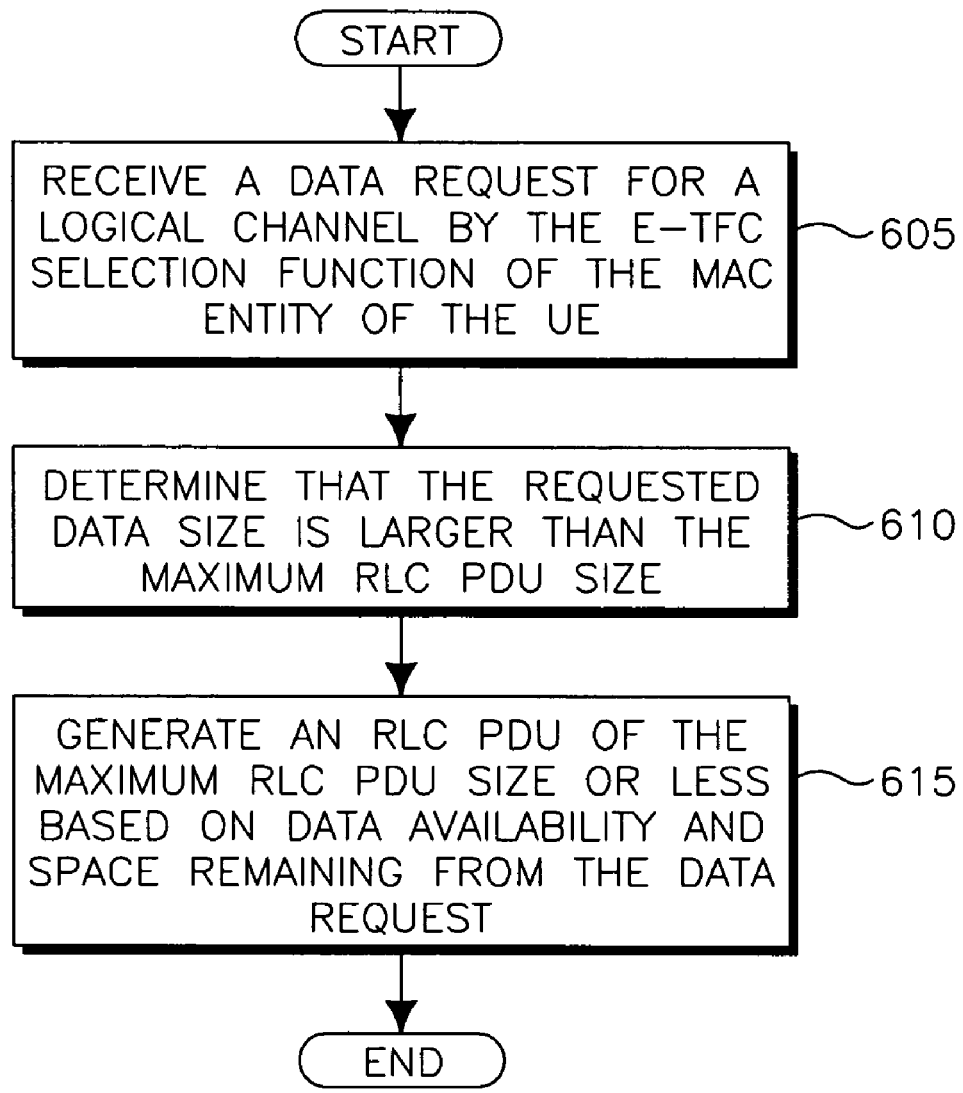
FIG. 6 is a flow diagram of an RLC PDU generation procedure with a maximum PDU size limit.

FIG. 6 is a flow diagram of an RLC PDU generation procedure with a maximum PDU size limit 600. Once the E-TFC selection procedure is performed, a data request for a logical channel is sent by the E-TFC selection function of the MAC (step 605). If it is determined that the requested data size is larger than the maximum RLC PDU size (step 610), the RLC entity 210 may generate at least one RLC PDU of the maximum RLC PDU size. The RLC entity 210 may continue generating RLC PDUs of the maximum RLC PDU size, or less than the maximum RLC PDU size, until there is no more space available from the data request or no more data is available in the RLC entity. If there is no space available from the data request or if there is no additional data to transmit, the RLC entity 210 does not generate any more RLC PDUs. Alternatively, if the RLC is restricted to only send one RLC PDU per TTI, the RLC entity 210 may send the PDU of the maximum RLC PDU size and stop generating RLC PDUs.

Figure 7:
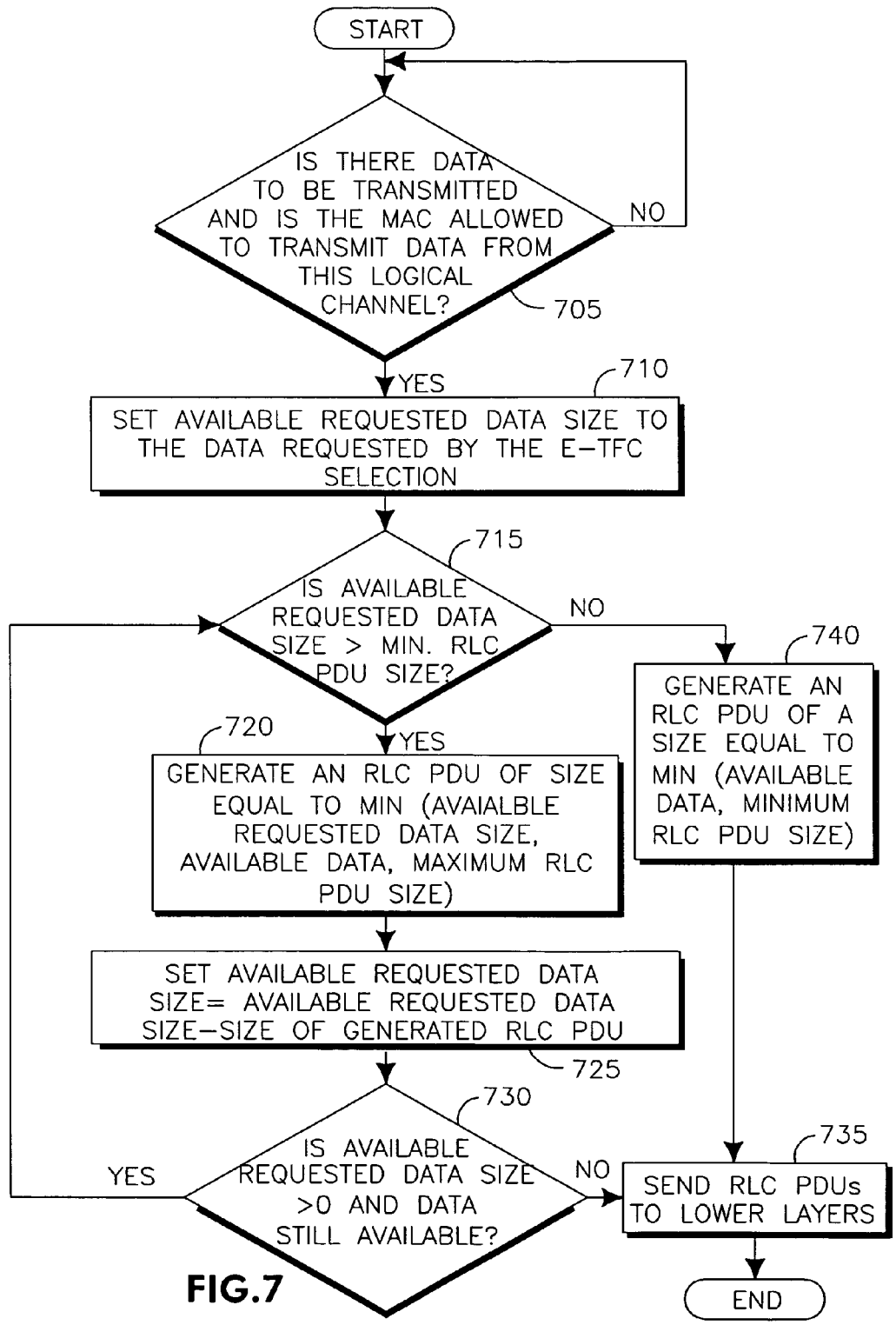
FIG. 7 is a flow diagram of a hybrid RLC procedure for implementing minimum and maximum RLC PDU restrictions.

FIG. 7 shows a flow diagram of a hybrid RLC procedure 700 for implementing a fully radio aware RLC with both minimum and maximum RLC PDU size restrictions.

The RLC PDU size may be less than or equal to the maximum RLC PDU size and greater than or equal to the minimum RLC PDU size (if data is available). In one embodiment, the UTRAN 300 determines the maximum RLC PDU size and communicates the maximum RLC PDU size value to the UE 200 using L2 or L3 signaling. The signaling of the maximum RLC PDU size value may occur upon radio bearer configuration/setup or radio bearer reconfiguration. Further, the signaling of the maximum RLC PDU size value may occur upon transport channel configuration or transport channel reconfiguration. Upon receipt of the signaled maximum RLC PDU size value, the UE 200 is configured to generate RLC PDUs that are less than or equal to the maximum RLC PDU size value. A MAC PDU for a current TTI may contain more than one RLC PDU or segments of RLC PDUs if the requested data size or requested number of bits from the MAC is greater than the maximum RLC PDU size.

In another embodiment, the UTRAN 300 broadcasts the maximum RLC PDU size to all UEs 200 in a particular cell. The UTRAN 300 broadcasts the maximum RLC PDU size using a common channel such as the enhanced random access channel (E-RACH).

The minimum RLC PDU size may be configured in any one, or a combination, of the following ways. The minimum RLC PDU size may be configured using RRC layer signaling. For example, the UTRAN 300 may configure the UE 200 to use a minimum RLC PDU size using the RRC information element (IE) "RLC info." Then again, the minimum RLC PDU size may be derived from a minimum allowed MAC segment size. For example, the minimum RLC PDU size may be a multiple of a minimum MAC segment size. Alternatively, the minimum RLC PDU size may be a static value that is preconfigured in the UE 200. Further, the minimum RLC PDU size may be a dynamic value that is determined based on the average value of the smallest selected E-TFCs or the average of requested data sizes. If the number of bits requested from the given logical channel as part of the E-TFC selection procedure is lower than the minimum RLC PDU size, then RLC PDUs with a size equal to the minimum RLC PDU size are still created and are sent to the lower layers if data is available. Additionally, if the requested data size from the given logical channel as part of the E-TFC selection procedure is lower than the minimum RLC PDU size, an RLC PDU with a size less than the minimum RLC PDU size may be created and sent to the lower layers thereby maintaining the benefits of not padding at the RLC level.

In another embodiment, if the requested data size from the given logical channel as part of the E-TFC selection procedure is lower than the minimum RLC PDU size, no RLC PDUs are sent to the lower layers.

For purposes of the following discussion, the function MIN (A, B) provides the minimum value from among the parameters A and B. Referring to FIG. 7, if there is data available for transmission, and the MAC is requesting data for this logical channel (step 705), an available requested data size may be determined based on the data requested or allowed for transmission by the MAC for this logical channel, selected by the E-TFC selection procedure (step 710). The available requested data size corresponds to the number of bits requested for the given logical channel as part of the E-TFC selection.

If the available requested data size is determined to be greater than the minimum RLC PDU size (step 715), then at least one RLC PDU of a size equal to the smaller of the available data, available requested data size, or maximum RLC PDU size is generated (step 720).

The available requested data size is then set to the available requested data size minus the size of the generated RLC PDU (step 725). If the available requested data size is greater than zero and data is still available in the logical channel (step 730) and if available requested data size is greater than minimum RLC PDU size (step 715) then an additional RLC PDU of a size equal to the smaller of the available data, available requested data size, or maximum RLC PDU size is generated (step 720). This process is repeated until there is no more space available, (i.e., available requested data size is zero), or until there no more data available in this logical channel, or until the available requested data size is less than the minimum RLC PDU size. This is equivalent to the UE creating N RLC PDUs of maximum RLC PDU size, where N is equivalent to the integer value of the smaller of available requested data size or available data divided by the maximum RLC PDU size. The UE can then create on additional RLC PDU of size X, where X is equivalent to the remainder of the smaller of the available requested data or available data divided by the maximum RLC PDU size. If X is smaller than the minimum RLC PDU size, the UE then creates an RLC PDU of minimum RLC PDU size if data is available.

If the available requested data size is equal to or less than zero or no more data is available (step 730), the generated RLC PDU(s) are sent to lower layers (step 735) and the procedure ends.

Still referring to FIG. 7, if the available requested data size is determined to be not greater than the minimum RLC PDU size (step 715), an RLC PDU of a size equal to the smaller value of minimum RLC PDU size or available data is generated (step 740) and all the generated RLC PDUs are sent to lower layers (step 735). The generated RLC PDUs may contain padding bits or multiple concatenated RLC SDUs. Optionally, the RLC entity may also take into account the MAC-i header part to be added for every RLC PDU to be generated. For the purpose of this description, the MAC-i header is equivalent to h2, where h2 may be 16 bits. More specifically, when determining the available requested data size, the UE may subtract h2 every time an RLC PDU is generated or prior to generating the RLC PDU. For example, in step 710 the available requested data size may equal the data requested by the E-TFC selection—h2. One other option would be to perform this step by the E-TFC selection function in the MAC entity. Once an RLC PDU is generated (step 720), then in 725, the available requested data size may be updated by subtracting the size of the generated RLC PDU and h2.

In a first alternative embodiment, if the available requested data size is determined to be less than the minimum RLC PDU size (step 715), an RLC of a size smaller than the minimum RLC PDU size may be generated. As a result, the use of padding bits at the RLC level may be avoided.

In a second alternative embodiment, if the available requested data size is determined to be less than the minimum RLC PDU size (step 715), an RLC PDU of size N times the requested data size is generated such that the size of the generated RLC PDU is greater than or equal to the minimum RLC PDU size. The value of N may be preconfigured or determined at the time of transmission to account for changes to channel conditions.

In a third alternative embodiment, if the available requested data size is determined to be less than the minimum RLC PDU size (step 715), then no RLC PDUs are sent to the lower layers.

The RLC PDU generation procedure 700 of FIG. 7 is an example that applies to a first transmission of new data where retransmissions are not taken into account in the RLC PDU creation. In the RLC generation procedure 700, only a first transmission of new data may be radio aware and data retransmissions may not be modified because an RLC PDU is already created. In an alternate embodiment, the RLC generation procedure 700 may only be applicable to a first transmission of new data. All data retransmissions may be sent to lower layers as full RLC PDUs even if the data field size based on the data request for a logical channel by the E-TFC selection function is smaller or larger than the data retransmission.

If the available requested data size based on the data request for a logical channel by the E-TFC selection function is larger than the sum of retransmitted RLC PDU(s) and there is more new data is available for transmission, one or a combination of the following may be performed.

The RLC entity 210 of FIG. 2 may be modified to send the retransmitted RLC PDU(s) and generate one or more RLC PDUs to be sent to the MAC entity 215. The size of the new RLC PDUs to generate may be determined based on the available requested data size, wherein the available requested data size is determined by subtracting the size of the retransmitted RLC PDUs from the original available requested data size, determined in step 710 of FIG. 7. Once the updated available requested data size is determined, and if it is not equivalent to zero or less than zero, the UE may continue with the steps 715 and on in FIG. 7. The MAC-i header part may also be taken into account for retransmissions. As mentioned above, h2 may be subtracted in 710. When the size of the retransmitted RLC PDUs is subtracted from the available data size determined in 710, h2*Y may also be subtracted, where Y is equivalent the number of retransmitted RLC PDUs.

Alternatively, the RLC entity 210 may be modified to send both the retransmitted RLC PDU and a new RLC PDU generated based on the size of a remaining E-TFC selection size with the option of applying lower and upper boundary restrictions to the RLC PDU size. After performing E-TFC selection, if RLC PDUs need to be retransmitted, the available requested data size is decreased by the size of the RLC PDUs needing retransmission.

As stated above, an RLC SDU may be segmented to fit into a selected RLC PDU size. The remaining RLC SDU segment may be handled in any or a combination of the following ways.

The remaining RLC SDU segment may be stored in the transmission buffer 235 in the RLC entity 210. Then again, the remaining RLC SDU segment may be stored in a SDU segmentation buffer in the RLC entity 210 until a next transmission opportunity. In the next transmission opportunity, the RLC SDU segment may be sent as a single RLC PDU or concatenated to another RLC SDU so that that the remaining RLC SDU segment fits into the selected RLC PDU size.

Alternatively, the RLC entity 210 may be modified to generate another RLC PDU or X number of RLC PDUs having the same size as a current requested data size. The number X is equivalent to the integer value of the remaining RLC PDU segment divided by the current requested data size. The at least one created RLC PDU is then stored in the transmission buffer 235 for transmission in a next TTI alone or in combination with other RLC PDUs.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU) for generating a radio link control (RLC) protocol data unit (PDU), the method comprising:

receiving a data request for a logical channel as part of an enhanced dedicated channel (E-DCH) transport format combination (E-TFC) selection procedure in a medium access control (MAC);

determining a data field size for the RLC PDU, wherein the data field size is determined such that the RLC PDU size of the RLC PDU is equivalent to the data requested for the logical channel by a current E-TFC selection, and wherein the RLC PDU size is less than a configured minimum RLC PDU size when data to be transmitted is insufficient to create a RLC PDU of the configured minimum RLC PDU size, and the RLC PDU size of the RLC PDU is greater than or equal to the configured minimum RLC PDU size when the data to be transmitted is sufficient to create a RLC PDU of the configured minimum RLC PDU size or greater; and generating the RLC PDU based on the determined data field size for transmission in a current transmission time interval (TTI).

2. The method of claim 1, wherein the RLC PDU size is less than or equal to a configured maximum RLC PDU size.

3. The method of claim 2, wherein the configured maximum RLC PDU size is received by RRC signaling.

4. The method of claim 1, wherein the configured minimum RLC PDU size is received by RRC signaling.

5. The method of claim 1, wherein the determined data field size, or RLC PDU size accounts for an addition of a MAC-i header to be added by the medium access control (MAC) entity when the RLC PDU is generated.

6. The method of claim 1, wherein the data request corresponds to an available space for the logical channel in a transport block and accounts for an improved medium access control (MAC-is) header and the data in a corresponding MAC segmentation entity.

7. The method of claim 1, wherein the data field size of the generated RLC PDU is equivalent to the data available for the logical channel.

8. The method of claim 1, wherein if the determined data field size is larger than a configured maximum RLC PDU size, N RLC PDUs of the configured maximum RLC PDU size are generated, wherein N is equivalent to an integer value of the smaller of the data field or the available data divided by the maximum RLC PDU size.

9. The method of claim 8, wherein if data is available, one additional RLC PDU of size of the greater of the minimum RLC PDU size or size of the remainder of the data available for the logical channel divided by the maximum RLC PDU size is generated.

10. The method of claim 8, wherein an RLC service data unit (SDU) is segmented to fit into the selected RLC PDU size and there is at least one remaining RLC SDU segment.

11. The method as in claim 10, further comprising storing any remaining segment of the RLC SDU in an RLC transmission buffer.

12. The method of claim 11, wherein at least one RLC SDU delivered by higher layers is stored in a transmission buffer until it is segmented and concatenated into at least one RLC PDU for transmission in a current TTI.

13. A wireless transmit/receive unit (WTRU) for generating a radio link control (RLC) protocol data unit (PDU), the WTRU comprising:

an RLC entity configured to receive a data request for a logical channel as part of an enhanced dedicated channel (E-DCH) transport format combination (E-TFC) selection procedure;

a processor configured to:

determine a data field size for the RLC PDU, wherein the data field size of a RLC PDU is determined such that the RLC PDU size is equivalent to the data requested for the logical channel by a current E-TFC selection, and wherein the RLC PDU size is less than a configured minimum RLC PDU size when data to be transmitted is insufficient to create a RLC PDU of the configured minimum RLC PDU size, and the RLC PDU size of the RLC PDU is greater than or equal to the configured minimum RLC PDU size when the data to be transmitted is sufficient to create a RLC PDU of the configured minimum RLC PDU size or greater; and generate the RLC PDU based on the determined data field size; and a transmitter configured to transmit the data in at least one RLC PDU in a current transmission time interval (TTI).

14. The WTRU of claim 13, wherein the processor is further configured to: segment an RLC service data unit (SDU) to fit into the requested RLC PDU size.

15. The WTRU of claim 14 further comprising: a transmission buffer configured to store any remaining segment of the RLC SDU.

16. The WTRU of claim 13, wherein the RLC PDU size is less than or equal to a configured maximum RLC PDU size.

17. The WTRU of claim 16, wherein the configured maximum RLC PDU size is received by RRC signaling.

18. The WTRU of claim 13, wherein if the determined data field size is larger than a configured maximum RLC PDU size, N RLC PDUs of the configured maximum RLC PDU size are generated, wherein N is equivalent to an integer value of the smaller of the data field or the available data divided by the maximum RLC PDU size.

19. The WTRU of claim 18, wherein if data is available, one additional RLC PDU of size of the greater of the minimum RLC PDU size or remainder of the data field divided by the maximum RLC PDU size is generated.

20. The WTRU of claim 13, wherein the configured minimum RLC PDU size is received by RRC signaling.

21. The WTRU of claim 13, wherein the determined data field size, or RLC PDU size accounts for an addition of a MAC-i header to be added by the medium access control (MAC) entity when the RLC PDU is generated.

22. The WTRU of claim 13, wherein the data field size of generated RLC PDU is equivalent to the data available for the logical channel.

* * * * *